United States Patent Office 3,438,908
Patented Apr. 15, 1969

3,438,908
STABILIZER FOR POLYURETHANE-PREMIX
Harold E. Reymore, Jr., Wallingford, and Adnan A. R. Sayigh, North Haven, Conn., assignors to The Upjohn Company, Kalamazoo, Mich., a corporation of Delaware
No Drawing. Filed Sept. 20, 1966, Ser. No. 580,615
Int. Cl. C09k 3/00
U.S. Cl. 252—182                    3 Claims

ABSTRACT OF THE DISCLOSURE

Polyurethane premixes containing an alkylene oxide-phosphoric acid adduct in association with a tertiary amine catalyst are stabilized by the addition of 1 to 6% of either N,N-diethylcyclohexylamine or N,N-dimethylethanolamine. The tertiary amine catalysts are those having at least twice the catalytic activity (i.e. activity as polyurethane forming catalysts) than the aforesaid stabilizing amines.

---

This invention relates to the stabilization of the activity of certain catalysts for the preparation of polyurethanes and is more particularly concerned with the stabilization of tertiary amine catalysts when the latter are stored in admixture with phosphorus-containing polyol blends, and with the stabilized compositions so produced.

The novel compositions of the invention comprise a storage stable blend of polyurethane catalyst and phosphorus-containing polyol which blend is adapted for use in the synthesis of flame retardant urethanes and comprises (a) a polyol selected from the class consisting of polyether polyols and polyester polyols having a hydroxyl number from about 300 to about 800, (b) a phosphoric acid-alkylene oxide adduct, (c) a tertiary amine catalyst for the reaction of an isocyanate group with active hydrogen and (d) as stabilizer for the blend, from about 1% to about 6% by weight, based on total weight of components (a) and (b), of a second tertiary amine having less than half the catalytic activity of, and a pKa value within ±2.5 units of, that of said tertiary amine catalyst.

The preparation of polyurethanes, both cellular and non-cellular by reaction of polyisocyanates with active hydrogen containing materials such as polyols, polyamines and the like, is well-known in the art; see, for example, Saunders et al. Polyurethanes, Chemistry and Technology Part II, Interscience Publishers, New York, N.Y., 1964. It is also well-known that incorporation of phosphorus-containing compounds into said polyurethanes imparts flame-retardancy to the latter or enhances the inherent flame-retardant properties thereof, ibid. pp. 47 to 48 and 200. A group of phosphorus-containing polyols which are frequently used in the production of flame retardant polyurethanes are the adducts of phosphoric acid and alkylene oxides such as ethylene oxide, propylene oxide, 1,2-butylene oxide, epichlorohydrin, and the like. Such products are exemplified in U.S. Patents 2,372,244, 3,094,549 and 3,099,676.

It is common practice in the polyurethane art to market the various components necessary to produce any particular type of cellular or non-cellular polyurethane and to leave the customer to mix said components as and when it is desired to produce the finished polyurethane. Obviously, it is advantageous, from the point of view of ease and expense of packaging and marketing to reduce to a minimum the number of components which need to be stored separately prior to formation of the polyurethane. This is generally accomplished by blending together and packaging in a single container those components which are compatible and storage stable in admixture one with the other. Ideally it is only necessary to use two containers to store the components of a polyurethane system. One container houses the polyisocyanate component. The second container houses a blend of the polyol (or polyols if more than one is used), the catalyst, and any other adjuvants such as surfactants, flame retardants, and blowing agents (in the case of foam).

Difficulties have been encountered in producing a single package containing all the polyol components and additives in such systems when said polyol component is inclusive of a tertiary amine catalyst in combination with a phosphorus-containing polyol which is a phosphoric acid-alkylene oxide adduct. Such a combination has hitherto proved unstable on storage insofar as the tertiary amine catalyst slowly loses its activity. The instability of such a mixture is particularly marked when water is present in the mixture. The deactivation of catalyst on storage under the above conditions is manifested in a number of ways. When the polyol mixture containing the catalyst is ultimately employed in the preparation of a polyurethane, deactivation of the catalyst leads to an increase in the reaction time over that which was predicted on the basis of the amount of catalyst initially incorporated in the mixtures. In the case of formation of cellular systems this phenomenon results in and undesirably decreased rate of rise of the foam, the resulting cell structure is coarser than expected and is not uniform, the density of foam is higher than anticipated, and, in the case of rigid foams, the thermal insulating capacity of the foam is below expectations.

The decrease in catalytic activity of the stored polyol-catalyst mixtures can be overcome by addition of further catalyst to the mixture prior to use. However, such a procedure not only defeats the whole object of having a minimum number of separate components which need mixing prior to use, but also requires a considerable amount of experimentation to determine the precise amount of additional catalyst to be used. The necessity to perform such testing immediately prior to use of the system entirely negates the initial convenience of having a minimum number of components which require only simple mixing at the time of use.

We have now found that the difficulties previously encountered in providing a polyol component which comprises in admixture a tertiary amine catalyst and a phosphoric acid-alkylene oxide adduct can be overcome in a simple but unexpected manner. This we have found that the incorporation, into the normally unstable mixture of tertiary amine catalyst and phosphoric acid-alkylene oxide adduct, of a second tertiary amine (hereinafter called the "stabilizing amine") which has a much lower order of catalytic activity in the isocyanate-active hydrogen reaction than the tertiary amine catalyst and which has a pKa differing from that of the tertiary amine catalyst by a factor less than about ±2.5 units.

The requirement that the stabilizing amine have a much lower order of catalytic activity than the tertiary amine catalyst present in the mixture to be stabilised means that the catalytic activity of the tertiary amine catalyst in the isocyanate-active hydrogen reaction is at least 2 times and is preferably at least 4 times greater than that of the stabilizing amine. The comparative catalytic activity of the various tertiary amines in question can be determined by standard techniques: for example by comparison of their relative activity in catalysing the reaction between phenyl isocyanate and 1-butanol under stardard conditions as described by J. Burkus, J. Org. Chem., 26, 779, 1961.

The second required characteristic of the stabilizing amine is that it has a pKa value which differs from that of the tertiary amine by a factor of not more than about ±2.5 units. Preferably, but not essentially, the pKa of the stabilizing amine is higher than that of the tertiary amine catalyst.

Tertiary amines possessing sufficient activity as catalysts in the reaction of isocyanate groups with active hydrogen atoms to be of practical value as catalysts in polyurethane-forming systems are well-known and well-recognized in the art. Examples of such tertiary amine catalysts are triethylamine, N,N,N',N'-tetramethylethlyenediamine, N,N,N',N'-tetraethylethylenediamine, N-methylmorpholine, 1,1,3,3-tetramethylguanidine, N,N,N'N'-tetramethyl-1, 3-butanediamine, 1,2,4-trimethylpiperazine, and triethylenediamine (1,4-diaza[2,2,2]bicyclooctane). The activity of these tertiary amines varies widely and is not apparently related to chemical structure. For example, triethylenediamine and 1,2,4-trimethylpiperazine are relatively fast catalysts; 1,1,3,3-tetramethylguanidine is relatively fast initially but the activity diminishes as the reaction proceeds. Triethylamine is intermediate in catalytic activity. N-methylmorpholine, and N-ethylmorpholine are relatively mild (slow) catalysts.

Any of the above known tertiary amine catalysts of the art can form the tertiary amine catalyst present in the polyol compositions which are stablized in accordance with the present invention. The choice of the stablizing amine to be used in any particular instance is governed by the properties of the particular tertiary amine catalyst in the mixture to be stabilized. Thus the differences in catalytic activity and in pKa between the tertiary amine catalyst and the stabilizing amine must be within the limits set forth above. It will thus be apparent that it is not possible to give a list of stabilizing amines which are universally effective i.e. can be used to stabilize any and all tertiary amine catalysts. Certain tertiary amines which are effective as stabilizing agents in respect of tertiary amine catalysts having comparatively high activity will be relatively ineffective in stabilizing tertiary amine catalysts having a lower order of activity such that the difference in order of activity between the tertiary amine catalyst and the stabilizing amine is less than the lower limit set forth above.

Further, as will be appreciated by one skilled in the art, a tertiary amine which shows relatively low, but useful activity, in the catalysts of the isocyanate-active hydrogen reaction can, under certain circumstances, fill the role of a stabilizing amine and, under other circumstances, fill the role of tertiary amine catalyst which is to be stabilized.

For example, N-methylmorpholine is a catalyst having relatively low catalytic activity which is commonly used as catalyst in polyurethane systems such as those designed to produce water blown flexible foams. Polyol compositions which are inclusive of this catalyst in association with a phosphoric acid-alkylene oxide adduct can be stabilized in accordance with this invention by use of a stabilizing amine such as N-methyl-N-(2-ethylhexyl)-cyclohexylamine which latter shows a catalytic activity rated as 0.16 when tested according to the method of Burkus, supra, and a pKa of 9.6; the corresponding figures for N-methylmorpholine are 1.0 and 7.41. On the other hand N-methylmorpholine can itself be used as a stabilizing amine, in accordance with the invention, in respect of a tertiary amine catalyst such as triethylenediamine which has a catalytic activity rated as 23.9 in the method of Burkus, supra, and a pKa of 5.4.

Bearing in mind (a) the above discussion as to the possibility that certain tertiary amines can function as stabilizing amines under certain circumstances and as tertiary amine catalysts under other circumstances and (b) that the relative catalytic activity and basicity of the tertiary amine catalyst to be stabilized and the stabilizing amine must fall within the limits set forth above, the following is a representative, but non-limitative, list of tertiary amines which can be employed as stabilizing agents in accordance with the invention. The rating of catalytic activity determined using the Burkus method, supra, together with the pKa of each of the stabilizing amines is given for purposes of reference.

| Stabilizing amine | Catalytic activity | pKa |
| --- | --- | --- |
| N,N-diethylcyclohexylamine | 0.70 | 10.0 |
| N-methyl-N-(2-ethylhexyl) cyclohexylamine | 0.16 | 9.6 |
| N-methylmorpholine | 1.00 | 7.41 |
| N-ethylmorpholine | 0.68 | 7.70 |
| Ethyl morpholinoacetate | 0.21 | 5.20 |
| Dimorpholinomethane | 0.075 | 7.40 |
| Pyridine | 0.25 | 5.29 |

The amount of stabilizing agent which it is necessary to employ in accordance with the invention is generally within the range of about 1% to about 6%, based on total weight of polyols in the blend. The concentrations in the higher end of the above range are generally necessary in the case of polyol components having a combination of phosphoric acid-alkylene oxide adduct and tertiary amine catalyst and containing water as blowing agent.

The phosphoric acid-alkylene oxide adducts forming the phosphorus-containing polyols which, in combination with a tertiary amine catalyst, are stabilized in accordance with the invention are those well-known in the art; see, for example, the aforesaid U.S. Patents 2,372,244, 3,094,549 and 3,099,676. Said adducts are prepared by reacting a phosphoric acid, generally one containing from about 72.4% $P_2O_5$ (i.e. 100% phosphoric acid) to about 78% $P_2O_5$ (106% phosphoric acid) or even higher, with an alkylene oxide such as ethylene oxide, propylene oxide, 1,2-butylene oxide and the like. The alkylene oxide is generally employed in an amount in excess of that theoretically required to react with all the free hydroxyl and anhydride moieties (if any) in the starting phosphoric acid. The adducts of phosphoric acid and propylene oxide are those most commonly used in the art and typical of such adducts is that which comprises the adduct of 1 mole of 105% phosphoric acid and about 5.8 moles of propylene oxide.

In certain instances the phosphoric acid-alkylene oxide adduct is the only polyol present in the composition which is stabilized in accordance with the invention. Generally speaking, however, the phosphoric acid-alkylene oxide adduct is present in admixture with one or more conventional non-phosphorus containing polyols. Said non-phosphorus containing polyols can be any of those commonly employed as the polyol component in the preparation of polyurethanes. Such polyols generally have an hydroxyl number within the range of about 300 to 800 and are inclusive of polyether and polyester polyols having average functionalities from about 2 to about 8.

Illustrative polyols which can be used in the process of the invention are polyethers such as polyoxyalkylene glycols, for example, the polyoxyethylene glycols prepared by the addition of ethylene oxide to water, ethylene glycols or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono- and polynuclear dihydroxy benzenes, e.g., catechol, resorcinol, hydroquinone, orcinol, 2,2-bis(p-hydroxyphenyl) propane, bis(p-hydroxyphenyl)-methane, and the like; polyethers prepared by reacting ethylene oxide, propylene oxide, or mixtures thereof with aliphatic polyols such as glycerol, trimethylolpropane, 1,2,6-hexanetriol, pentaerythritol, sucrose or glycosides, e.g., methyl, ethyl, propyl, butyl, and 2-ethylhexyl and like alkyl, arabinosides, xylosides, fructosides, glucosides, rhamnosides, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl - 4 - hydroxytetrahydropyran and 3,3,5,5-tetrakis (hydroxymethyl)-4-hydroxytetrahydropyran; or polyols containing an aromatic nucleus such as 2,2-bis(hydroxyphenyl) ethanol, pyrogallol, phloroglucinol, tris(hydroxyphenyl) alkanes, e.g., 1,1,3-tris(hydroxyphenyl) ethanes, and 1,1,3 - tris(hydroxyphenyl) propanes and the like; tetrakis(hydroxyphenyl) - alkanes, e.g., 1,1,3,3 - tetrakis (hydroxy-3-methylphenyl)-propanes, 1,1,4,4-tetrakis (hydroxyphenyl) butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde. Such polyols are available commercially from The Upjohn Company, Polymer Chemicals Division under the trade name Carwinols in various equivalent weight ranges.

Illustrative of the polyester polyols which can be employed in the process of the invention are those prepared from dibasic carboxylic acids and polyhydric alcohols, preferably trihydric alcohols. he dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used.

In addition to the tertiary amine catalyst, stabilizing amine, phosphoric acid-alkylene oxide adduct and any additional polyol, the stabilized compositions of the invention can, if desired, include any of the other additives normally used in preparing various types of polyurethanes and normally incorporated in the polyol component of the polyurethane-forming system. Such additives include pigments, fillers, and the like and, in the case of mixtures to be used in the production of foams, blowing agents, surfactants and cell stabilizers. Illustrative of the surfactants are the organosilicone polymers obtained by condensing a polyalkoxy polysilane with the monoether of a polyalkylene ether glycol in the presence of an acid catalyst. Other illustrative surfactants useful for the promotion of better dispersion of foam mix components are ethylene oxide modified sorbitan monopalmitate or ethylene oxide modified polypropylene ether glycol.

The blowing agents which can be present in the compositions stabilized in accordance with the invention include water, aliphatic hydrocarbons, and halogenated aliphatic hydrocarbons having a boiling point below about 100° C. and preferably below about 50° C., commonly employed in the polyurethane foam art. Examples of such hydrocarbons and halogenated hydrocarbons are propane, butane, hexane, octane, trichloromonofluoromethane, dichlorodifluoromethane, chlorotrifluoromethane, 1,1-dichloro-1-fluoroethane, 1,1-difluoro-1,2,2-trichloroethane and 1,1,1,2-tetrafluoro-2-chlorobutane, and mixtures of two or more of said compounds.

The proportions in which the various components can be present in the compositions stabilized in accordance with the invention are within the range of those generally employed in the art, the novel feature of said compositions being the incorporation therein of a stabilizing amine in the proportion set forth above. The stabilizing amine can be introduced into the said compositions in any convenient manner, for example, by adding the amine to the previously formed mixture of the other components. However it is preferred that the stabilizing amine be first mixed with the phosphoric acid-alkylene oxide adduct and the mixture so formed is then added to the remainder of the components of the mixture. For reasons which are not fully clear this method of operation appears to produce a significantly greater degree of stabilization than other methods of mixing the stabilizing amine with the components of the mixture.

The effectiveness of the stabilizing amine in stabilization of the catalytic activity of the tertiary amine in the compositions of the invention can be determined by observation of the variation, or lack of variation, with storage time of some property directly related to catalytic activity in the formation of the polyurethane from the stabilized polyol composition. In the case of stabilized polyols which are to be employed in the preparation of foams a very convenient indicator of catalytic activity is found in the observation of cream and rise time in the formation of foams from the stabilized polyols. "Cream time" is that time (in seconds) after the initial admixture of polyol composition and polyisocyanate, at which gas formation or bubble nucleation appears in the mixture. Usually this point is marked by a pronounced color change from dark brown to tan. The "rise time" is that time (in seconds) after the initial admixture of polyol composition and polyisocyanate, at which the rising foam has reached the top of a standard container, usually a 32 ounce waxed paper cup. The "final rise time" is that time (in seconds) after the initial admixture of polyol composition and polyisocyanate, at which all volume change has ceased. By carrying out observations on these three properties using standard conditions, identical polyisocyanate, standard containers etc., it is possible to compare with great accuracy the catalytic activity of the catalyst system in a polyol composition and also to observe any changes in this activity taking place on storage of a given composition.

The following examples describe the manner and process of making and using the invention and set forth the best mode contemplated by the inventors of carrying out the invention but are not to be construed as limiting.

EXAMPLE 1

A series of polyol blends containing tertiary amine catalyst (a mixture of N,N,N',N'-tetramethyl-1,3-butanediamine and triethylamine) in association with a propylene oxide-phosphoric acid adduct was prepared as follows. In each case 30 parts by weight of a polyol adduct (equiv. wt.=150) of one mole of 105% phosphoric acid and 5.8 moles of propylene oxide was admixed with 2 parts by weight of one of the following stabilizing amines: N,N-diethylcyclohexylamine (DECHA), N,N-dimethylethanolamine (DMEA), N-methyldiethanolamine (MDEA), or N,N,N',N'-tetraethylmethanediamine (TEMDA) [3 parts by weight per one hundred parts polyol of the latter were used]. The mixture so obtained was then added to a mixture of 70 parts by weight of a propylene oxide-polymethylene polyphenyl amine adduct having an equivalent weight of 130 (Carwinol 151: The Upjohn Company, Polymer Chemicals) 2 parts by weight of DC–201 (a water-soluble silicone-glycol copolymer cell-control agent and foam stabilizer: Dow Corning Corporation), 1 part by weight of N,N,N',N'-tetramethyl-1,3-butanediamine, 0.5 part by weight of triethylamine and 34 parts by weight of Freon 11–B. A control mixture was also prepared in exactly the same manner except that the stabilizing amine was omitted. The cream, rise time, and final rise time of each of the above polyol mixtures upon reaction with polyisocyanate was determined immediately after the mixtures were prepared and thereafter at lengthening intervals over a period of 210 days. The method used to determine the cream, rise and final rise times was as follows:

A 70 g. portion of the polyol mixture was weighed into a standard 32 ounce plastic coated container (No. 32TN6) and 54 g. of PAPI® (a polymethylene polyphenyl isocyanate of equivalent weight 133; The Upjohn Company) was added thereto. High speed mechanical mixing was immediately commenced and a stop watch was started simultaneously. Mixing was continued for 10 seconds after which the container was dropped away from the agitator slightly and allowed to spin for 2–3 seconds. The mixed liquid was then allowed to stand in the cup and the time (after start of the stop watch) at which creaming (see supra for definition) occurred was noted. A wooden tongue depressor was placed across the rim of the cup and the time (rise time) at which the rising foam contacted the depressor was noted. The foam was then allowed to rise until all volume change had ceased and the time (final rise time) at which this occurred was noted.

The results of the above tests on each of the polyol blends after storing for the noted lengths of time are recorded in Table I. These results indicate the comparative stability of the various mixtures on storage, the rate of loss of cream and rise time being proportional to the rate of loss of catalytic activity in the mixtures. It will be seen from these results that, in the absence of stabilizing amine, the rate of loss of catalytic activity is markedly high whereas the catalytic activity of the blends containing stabilizing amines shows little change after prolonged periods of storage.

showed marked loss of catalytic activity even after 3 days storage.

TABLE II

|  | Control, no stabilizer (sec.) | Stabilizer (sec.) | | |
| --- | --- | --- | --- | --- |
|  |  | DECHA | DMEA | MDEA |
| Original mix: |  |  |  |  |
| Cream | 18 | 25 | 12 | 16 |
| Rise | 34 | 51 | 22 | 33 |
| Final rise | 157 | 186 | 117 | 152 |
| After 3 days: |  |  |  |  |
| Cream | 27 | 26 | 10 | 17 |
| Rise | 52 | 50 | 17 | 36 |
| Final rise | 187 | 181 | 87 | 175 |
| After 7 days: |  |  |  |  |
| Cream | 27 | 22 | 12 | 22 |
| Rise | 70 | 45 | 22 | 45 |
| Final rise | 274 | 162 | 99 | 186 |
| After 14 days: |  |  |  |  |
| Cream | 25 | 21 | 10 | 18 |
| Rise | 81 | 41 | 17 | 38 |
| Final rise | 326 | 154 | 84 | 189 |
| After 28 days: |  |  |  |  |
| Cream | 33 | 26 | 13 | 26 |
| Rise | 86 | 47 | 22 | 50 |
| Final rise | 330 | 145 | 109 | 218 |
| After 59 days: |  |  |  |  |
| Cream |  | 22 | 15 | 24 |
| Rise |  | 45 | 25 | 55 |
| Final rise |  | 144 | 100 | 204 |
| After 93 days: |  |  |  |  |
| Cream | 45 | 26 | 16 | 26 |
| Rise | 164 | 47 | 27 | 68 |
| Final rise | 445 | 145 | 113 | 240 |
| After 153 days: |  |  |  |  |
| Cream | 47 | 22 | 16 | 30 |
| Rise | 175 | 37 | 31 | 84 |
| Final rise | 445 | 117 | 120 | 269 |
| After 210 days: |  |  |  |  |
| Cream |  |  | 19 |  |
| Rise |  |  | 30 |  |
| Final rise |  |  | 93 |  |
| After 240 days: |  |  |  |  |
| Cream |  | 23 |  |  |
| Rise |  | 46 |  |  |
| Final rise |  | 146 |  |  |

TABLE I

|  | Control, no stabilizer (sec.) | Stabilizer (sec.) | | | |
| --- | --- | --- | --- | --- | --- |
|  |  | DECHA | DMEA | MDEA | TEMDA |
| Original mix: |  |  |  |  |  |
| Cream | 18 | 16 | 15 | 18 | 16 |
| Rise | 34 | 31 | 29 | 39 | 29 |
| Final rise | 157 | 132 | 149 | 171 | 138 |
| After 3 days: |  |  |  |  |  |
| Cream | 27 | 19 | 14 | 18 | 16 |
| Rise | 52 | 38 | 28 | 44 | 31 |
| Final rise | 187 | 126 | 131 | 184 | 128 |
| After 7 days: |  |  |  |  |  |
| Cream | 27 | 20 | 16 | 26 | 20 |
| Rise | 70 | 41 | 32 | 55 | 41 |
| Final rise | 274 | 142 | 144 | 206 | 165 |
| After 14 days: |  |  |  |  |  |
| Cream | 25 | 22 | 14 | 23 | 18 |
| Rise | 81 | 48 | 27 | 47 | 36 |
| Final rise | 326 | 158 | 131 | 199 | 220 |
| After 28 days: |  |  |  |  |  |
| Cream | 33 | 20 | 18 | 29 | 25 |
| Rise | 86 | 38 | 35 | 62 | 51 |
| Final rise | 330 | 131 | 159 | 252 | 183 |
| After 59 days: |  |  |  |  |  |
| Cream |  |  | 20 | 30 | 28 |
| Rise |  |  | 40 | 64 | 67 |
| Final rise |  |  | 156 | 243 | 205 |
| After 93 days: |  |  |  |  |  |
| Cream | 45 | 26 | 24 | 33 | 32 |
| Rise | 164 | 50 | 46 | 83 | 82 |
| Final rise | 445 | 156 | 159 | 303 | 222 |
| After 153 days: |  |  |  |  |  |
| Cream | 47 | 22 | 21 | 40 |  |
| Rise | 175 | 44 | 60 | 135 |  |
| Final rise | >445 | 136 | 202 | 334 |  |
| After 210 days: |  |  |  |  |  |
| Cream |  |  | 26 |  |  |
| Rise |  |  | 88 |  |  |
| Final rise |  |  | 240 |  |  |

The above experiment was repeated with the exception that the amount of DECHA, DMEA and MDEA employed in the mixtures was doubled to 4 parts by weight per 30 parts of phosphoric acid-propylene oxide adduct. The results of tests for cream, rise and final rise time after storage of the resulting polyol blends for prolonged periods is shown in Table II. It will be seen that the catalytic activity of the various blends treated with stabilizing amines remained practically unchanged even after storage for 153 days whereas the unstabilized control

EXAMPLE 2

Four polyol mixtures were prepared using the ingredients and proportions shown in Example 1 with N,N-dimethylethanolamine as stabilizing amine in amounts of 2 parts by weight, in the case of two of the mixtures, and 3 parts by weight, in the case of the other two mixtures, per 30 parts by weight of phosphoric acid-alkylene oxide. To one of each pair of said mixtures was added 1.2 parts by weight of water. The cream and rise times of the mixtures were determined initially and after storage for various periods of time. The results are recorded in Table III.

TABLE III

| DMEA, parts by weight | Premixes without water (sec.) | | Premixes with water (sec.) | |
|---|---|---|---|---|
| | 2 | 3 | 2 | 3 |
| Original mix: | | | | |
| Cream | 21 | 18 | 21 | 18 |
| Rise | 83 | 72 | 83 | 70 |
| After 3 days: | | | | |
| Cream | 24 | 21 | 17 | 15 |
| Rise | 104 | 74 | 122 | 113 |
| After 7 days: | | | | |
| Cream | 23 | 22 | 23 | 20 |
| Rise | 102 | 88 | 246 | 173 |
| After 14 days: | | | | |
| Cream | 23 | 19 | 32 | 25 |
| Rise | 93 | 73 | 300 | 202 |
| After 28 days: | | | | |
| Cream | 22 | 17 | | |
| Rise | 114 | 117 | | |
| After 58 days: | | | | |
| Cream | 23 | 20 | | |
| Rise | 121 | 93 | | |

We claim:

1. A storage stable blend of a phosphorus-containing polyol and a tertiary amine catalyst adapted for use as the polyol component in the synthesis of flame retardant polyurethanes which blend consisting essentially of (a) an adduct of phosphoric acid and propylene oxide (b) a mixture of N,N,N',N'-tetramethyl-1,3-butanediamine and triethylamine and (c) from 1% to 6% based on total polyol of a stabilizing amine selected from the class consisting of N,N-diethylcyclohexylamine and N,N-dimethylethanolamine.

2. A storage stable blend of a phosphorus-containing polyol and a tertiary amine catalyst adapted for use as the polyol component in the synthesis of flame retardant polyurethanes which blend consisting essentially of
   (a) an adduct of phosphoric acid and an alkylene oxide selected from the class consisting of ethylene oxide, propylene oxide, 1,2-butylene oxide and epichlorohydrin;
   (b) a tertiary amine polyurethane catalyst selected from the class consisting of triethylamine, N,N,N',N'-tetramethylethylene diamine, N,N,N',N'-tetramethyl-1,3 - butane diamine, 1,2,4 - trimethylpiperazine, 1,1,3,3-tetramethylguanidine and triethylenediamine; and
   (c) as stabilizer for the blend, from about 1% to about 6% by weight, based on total weight of polyol in the composition, of N,N-diethylcyclohexylamine.

3. A storage stable blend of a phosphorus-containing polyol and a tertiary amine catalyst adapted for use as the polyol component in the synthesis of flame retardant polyurethanes which blend consisting essentially of
   (a) an adduct of phosphoric acid and an alkylene oxide selected from the class consisting of ethylene oxide, propylene oxide, 1,2-butylene oxide and epichlorohydrin;
   (b) a tertiary amine polyurethane catalyst selected from the class consisting of 1,1,3,3-tetramethylguanidine, and triethylenediamine; and
   (c) as stabilizer for the blend, from about 1% to about 6% by weight, based on total weight of polyol in the composition, of N,N-dimethylethanolamine.

References Cited

UNITED STATES PATENTS 3,314,902  4/1967  Wismer et al. _____ 260—2.5

OTHER REFERENCES 3,099,676  7/1963  Lanham _____ 260—77.5 X
3,192,296  6/1965  Tallman et al. ____ 260—77.5 X LEON D. ROSDOL, *Primary Examiner.*

S. D. SCHWARTZ, *Assistant Examiner.*

U.S. Cl. X.R.

252—188.3; 260—2.5, 77.5